No. 12,786. REISSUED APR. 28, 1908.

J. S. PATTEN.

LUBRICATING PACKING HOLDER FOR CAR AXLE BOXES.

APPLICATION FILED SEPT. 8, 1906.

2 SHEETS—SHEET 1.

Witnesses

G. R. Thomas.

Wm. E. Chandlee.

Inventor

James S. Patten

By Chandlee & Chandlee

Attorneys

THE NORRIS PETERS CO., WASHINGTON, D. C.

No. 12,786. REISSUED APR. 28, 1908.

J. S. PATTEN.

LUBRICATING PACKING HOLDER FOR CAR AXLE BOXES.

APPLICATION FILED SEPT. 8, 1906.

2 SHEETS—SHEET 2.

Witnesses

G. R. Thomas

Wm. E. Chandlee.

Inventor

James S. Patten

By Chandlee & Chandlee.

Attorneys

THE NORRIS PETERS CO., WASHINGTON, D. C.

UNITED STATES PATENT OFFICE.

JAMES S. PATTEN, OF BALTIMORE, MARYLAND, ASSIGNOR OF THREE-TWELFTHS TO RICHARD M. DUVALL AND NINE-TWELFTHS TO MORTON SCHAEFFER, OF BALTIMORE, MARYLAND.

LUBRICATING-PACKING HOLDER FOR CAR-AXLE BOXES.

No. 12,786. Specification of Reissued Letters Patent. Reissued Apr. 28, 1908.

Original No. 770,242, dated September 13, 1904, Serial No. 132,260. Application for reissue filed September 8, 1906. Serial No. 333,800½.

*To all whom it may concern:*

Be it known that I, JAMES S. PATTEN, a citizen of the United States, residing at Baltimore, in the county of Baltimore City, State of Maryland, have invented certain new and useful Improvements in Lubricating-Packing Holders for Car-Axle Boxes; and I do hereby declare the following to be a full, clear, and exact description of the invention, such as will enable others skilled in the art to which it appertains to make and use the same.

My invention is an improvement in lubricating devices for car-axle boxes; and it consists in certain novel constructions and combinations of parts, as will be hereinafter described and claimed.

Figure 1:
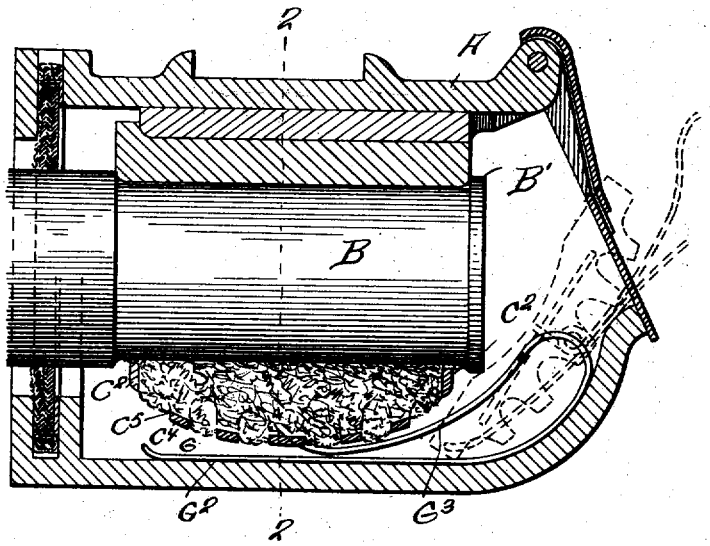
Figure 2:
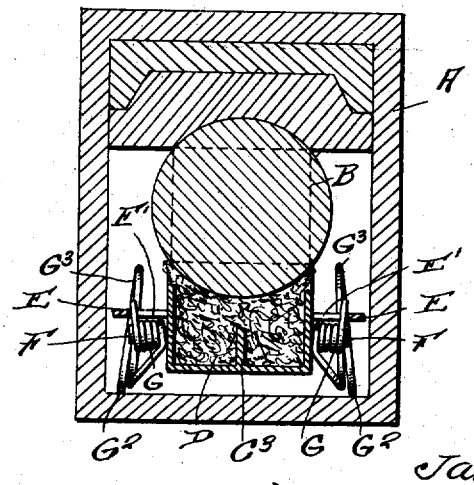
Figure 3:
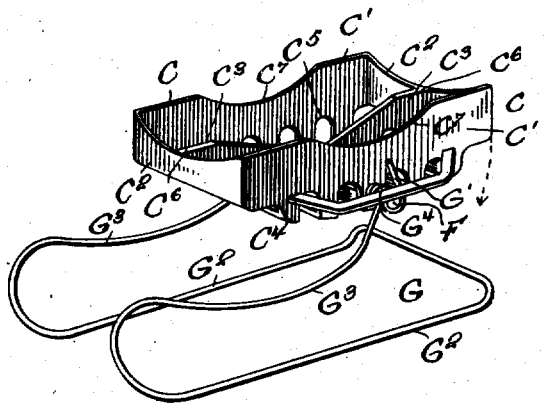

In the drawings—Figure 1 is a longitudinal section of a car-axle box provided with my improvements. Fig. 2 is a cross-sectional view on about line 2—2 of Fig. 1. Fig. 3 is a detail perspective view of the carrier mounted on its actuating and supporting spring, and Fig. 4 is a side view of the carrier and spring, the carrier being inverted to the position for permitting the application or detachment of the spring.

By my invention I seek to provide a lubricating device in which the packing-carrier will be so constructed as to hold the packing and prevent the same from shifting in the direction of the circumference of the journal, in which the carrier will take the pressure of the actuating-springs, so the latter will not tend to condense or compress the packing against the journal, in which the packing-carrier will be preferably of a width not exceeding the square of the journal, in which the carrier shall have lateral studs or trunnions and also lateral flanges to permit the application of the spring to the carrier when the latter is inverted, and in which the lateral flanges will lock the spring to the carrier when the latter is in position for use and will also prevent the lateral shifting of the carrier in the car-axle box.

In the construction shown, the box A and the journal B may be of ordinary construction, it being intended that my invention can be applied readily to the boxes and journals now in use as well as to those which may be hereinafter manufactured. The square of the journal B is indicated in dotted lines, Fig. 2. From such figure it will be noticed the carrier C does not equal in width the diameter of the journal, but stands in from the opposite sides of said journal, thus avoiding the tendency of dust and the like which may lodge on the journal to pass into the carrier and causing such waste matter to discharge outside the carrier and preventing it from being taken up by the waste D. It may be stated that the waste D may be ordinary cotton or wool waste, or it may be felt or other suitable absorbent material which when placed in the carrier will press against the journal B and convey thereto the oil in the bottom of the box.

Figure 4:
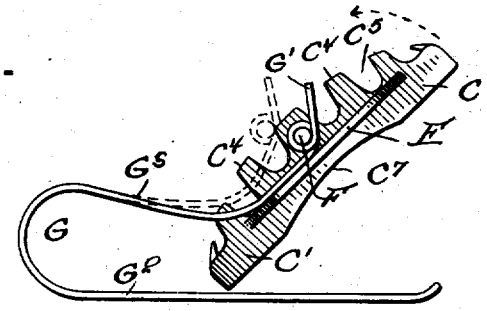

The carrier C, as best shown in Fig. 3, is in the form of an elongated rectangular rack having the sides $C'$ and $C^2$, a longitudinal partition $C^3$, and bottom bars $C^4$, and it is preferably rounded on its under side from end to end, as shown in Figs. 1, 3, and 4, which form enables it to be easily inserted in and removed from the axle-box. The bottom bars $C^4$ of the carrier are spaced apart to permit the waste D to come in contact with the oil in the bottom of the box and freely feed oil by capillary attraction to the journal B and also to permit the waste to squeeze between said bars, and thus relieve itself from undue pressure in case the rack is overloaded. By preference the bottom bars $C^4$ extend crosswise or between the opposite side plates $C'$, and such side plates are preferably provided at $C^5$ with slots formed from their lower edges in line with the spaces between the bottom bars $C^4$, as shown in Figs. 2 and 3, thus increasing the exposure of the waste D to the oil and affording a greater facility for the waste to hang from and below the carrier C into contact with the oil in the box. The opposite ends of the carrier are curved in their upper edges to conform to the curvature of the journal and receive the pressure of the spring acting to force the carrier against said journal. This pressure is also borne in a degree by the end portions $C^6$ of the partition $C^3$, said end portions $C^6$ extending for a short distance in the same plane as the portions of the end plates $C^2$ with which they connect. By this means I provide an ample bearing at the opposite ends of the carrier C to receive the pressure and wear of the journal in the use of the device, and so avoid any condensing or compression of the waste by the action of the spring in forcing the carrier toward the journal.

The side plates C′ of the carrier are cut away between their ends on curved lines, forming recesses $C^7$ in their upper edges. The purpose of these recesses $C^7$ is to enable the carrier to pass the flange B′ at the outer end of the journal B in placing the carrier in and removing it from the box, as will be understood from dotted lines, Fig. 1. The longitudinal partition $C^3$ is preferably central and is an important feature of my invention, as by it I prevent the shifting of the packing laterally within the carrier, and so prevent the accumulation of the waste at one side or the other of the carrier by the turning of the journal. Laterally-projecting ribs or flanges E are provided on the outer sides of the opposite side plates C′ and project so their outer edges stand adjacent to the opposite sides of the box A and serve as stops to prevent the lateral displacement of the carrier C. Trunnion-studs F project laterally from the carrier slightly below the flanges E, and the said flanges are provided with slots or openings E′ above the studs F to receive the extended ends or projecting portions G′ of the actuating-spring G when the carrier is adjusted to position for use, as shown in Figs. 2 and 3.

The spring G has the base portion $G^2$ to rest upon the bottom of the box A and the returned arms $G^3$ having at $G^4$ openings to fit over the studs F, the projections G′ extending upwardly from the bearing portions $G^4$ and lying within the openings E′ in the flanges E when the parts are arranged as shown in Figs. 2 and 3. The bearing portions $G^4$ to receive the stud F are preferably formed by coiling the wire, as shown. The projecting portions G′ operate as stops and serve to hold the spring duly engaged with the trunnions when the carrier is arranged for use, as shown in Figs. 2 and 3. If, however, it be desired to detach the spring-carrier C, it is only necessary to turn the carrier from the position shown in Fig. 3, to that shown in Fig. 4, when the stop projections G′ will stand clear of the flanges E, and the bearings $G^4$ can be slipped off the studs F.

It will be noticed from the drawings and foregoing description that the frame of my carrier is so constructed at its ends as to prevent the waste from being compressed too hard, and the bottom of said frame is slotted to permit portions of the waste to squeeze through and relieve itself from undue pressure, the construction of the top of the frame to bear at its ends against the axle and the slotting of the bottom of the said frame operating together to prevent the condensation of the waste.

Having thus described my invention, what I claim as new, and desire to secure by Letters Patent, is—

1. The improvement in lubricating devices herein described, comprising an actuating-spring having a base portion and returned arms provided with bearing portions and with stop projections beyond the same, and the carrier in the form of a rack having side plates curved in their upper edges between their ends, to permit the insertion of the carrier-box when rocked on its pivots, the end plates curved from side to side in their upper edges, the partition-plate arranged between the side plates and having its upper edges at its ends in a common plane with those portions of the upper edges of the end plates with which it connects, the studs projecting from the opposite sides of the carrier, and the flanges projecting from the opposite sides of the carrier above the studs and having openings to receive the stop portions of the spring when the carrier is adjusted to the position for use substantially as set forth.

2. In a lubricating device, a packing-carrier comprising a rack-like box having its ends curved in their upper edges to conform to the journal and its sides provided in their upper edges with curved recesses between their ends to permit the box to pass the end flange of a journal in inserting and removing the carrier, and an actuating-spring for said carrier substantially as set forth.

3. In a lubricating device, a packing-carrier comprising a box-like rack having its side plates provided in their upper edges between their ends with recesses to facilitate the insertion and removal of the carrier and having its end plates curved in their upper sides to conform to a journal, and also to facilitate the insertion of the carrier into the standard car-axle box, substantially as set forth.

4. In a lubricating device, a packing-carrier having side plates provided with recesses in their upper edges between their ends to facilitate the insertion and removal of the carrier past the end flange of a journal and having its end plates curved in their upper edges to conform to a journal and provided with a partition extending between said end plates substantially as set forth.

5. In a lubricating device, a carrier consisting of a rack-like box having side plates and a series of bottom bars spaced apart and extending between the opposite side plates, the latter being provided with slots in their lower edges in line with the spaces between the bottom bars, substantially as set forth.

6. In a lubricating device, a packing-carrier comprising a box having its bottom provided with openings to permit waste therein to communicate with oil below, and having its upper edge curved at its ends to conform to a journal, and recessed or cut away in its upper edge at its opposite sides, to facilitate the insertion and removal of the carrier, substantially as set forth.

7. The combination, with a packing-carrier having laterally-projecting studs, of a supporting-spring having bearings to fit said studs and projections beyond said bearings, and devices on the packing-carrier for engagement by said projections and to hold the studs in said bearings when the carrier is adjusted to position for use, substantially as set forth.

8. The combination in a lubricating device, of a spring-support having bearings for the packing-carrier, and the packing-carrier pivoted between its ends to said support, and having its ends rounded on their under side and provided in their upper edges with curved bearings to conform to the axle, and also to aid in inserting the lubricator in and removing it from a car-axle box and having the sides of said carrier recessed longitudinally in their upper edges, substantially as and for the purposes set forth.

9. A packing carrier for axle boxes, comprising a receptacle having its bottom provided with openings to permit waste therein to communicate with oil below, and having vertical sides provided with laterally-projecting studs, and a supporting spring having its opposite ends bent to form bearings adapted to embrace said studs, said spring including a base portion adapted to rest upon the bottom of the axle box.

10. A packing carrier comprising a box having laterally projecting studs formed on its sides, a supporting-spring having its opposite ends bent to form bearings adapted to embrace said studs, and means located upon the carrier sides to prevent disengagement of said bearings from said studs when the carrier is adjusted to position for use.

11. A packing carrier, comprising a box having its bottom provided with openings to permit waste therein to communicate with oil below, and having laterally-projecting studs formed on its sides, a supporting spring having its opposite ends bent to form bearings adapted to embrace said studs, and means located upon said sides to prevent disengagement of said bearings from said studs when the carrier is adjusted to position for use.

In testimony whereof, I affix my signature, in the presence of two witnesses.

JAMES S. PATTEN.

Witnesses:
WILLIAM S. LEVY,
WM. CHAS. PISTEL.